(12) United States Patent
Adamczyk et al.

(10) Patent No.: US 7,348,882 B2
(45) Date of Patent: *Mar. 25, 2008

(54) METHOD AND SYSTEM FOR ALERTING A PERSON TO A SITUATION

(75) Inventors: Maria Adamczyk, Alpharetta, GA (US); Edward Silver, Atlanta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/433,950

(22) Filed: May 15, 2006

(65) Prior Publication Data

US 2006/0202819 A1    Sep. 14, 2006

Related U.S. Application Data

(63) Continuation of application No. 11/180,424, filed on Jul. 13, 2005, now Pat. No. 7,046,140, which is a continuation of application No. 10/439,259, filed on May 14, 2003, now Pat. No. 7,071,821.

(51) Int. Cl.
    G08B 11/04    (2006.01)
(52) U.S. Cl. ............ 340/539.18; 340/506; 340/539.13; 379/51; 455/521
(58) Field of Classification Search ............. 340/432.3, 340/539.13, 539.18, 539.1, 506, 517, 539, 340/825.36, 825.49; 455/7, 13.1, 521, 432.3; 379/51, 37
See application file for complete search history.

(56) References Cited

U.S. PATENT DOCUMENTS

| | | | |
|---|---|---|---|
| 5,334,974 A | 8/1994 | Simms et al. | |
| 5,388,147 A | 2/1995 | Grimes | |
| 5,572,204 A | 11/1996 | Timm et al. | |
| 5,629,687 A | 5/1997 | Sutton et al. | |
| 5,686,910 A | 11/1997 | Timm et al. | |
| 5,687,215 A | 11/1997 | Timm et al. | |
| 5,859,628 A * | 1/1999 | Ross et al. | 345/173 |
| 5,890,061 A | 3/1999 | Timm et al. | |
| 6,014,430 A | 1/2000 | Gosney et al. | |
| 6,073,004 A | 6/2000 | Balachandran | |
| 6,088,586 A | 7/2000 | Haverty | |
| 6,097,938 A | 8/2000 | Paxson | |
| 6,362,778 B2 * | 3/2002 | Neher | 342/357.07 |
| 6,442,241 B1 | 8/2002 | Tsumpes | |
| 6,501,420 B2 | 12/2002 | Townsend et al. | |
| 6,509,830 B1 | 1/2003 | Elliott | |
| 6,807,564 B1 * | 10/2004 | Zellner et al. | 709/206 |
| 6,853,714 B2 | 2/2005 | Liljestrand et al. | |
| 6,868,074 B1 * | 3/2005 | Hanson | 370/328 |

* cited by examiner

Primary Examiner—Davetta W. Goins
(74) Attorney, Agent, or Firm—Cantor Colburn LLP

(57) ABSTRACT

A method of alerting a person to a situation is disclosed. An alert signal is received from a mobile communication device in signal communication with a wireless communication system and an alert system. In response to the alert signal, a database of an alert service is accessed for information relating to the subscriber of the mobile communication device and for information relating to a contact list associated with the subscriber. Information is obtained from the wireless communication system relating to the location of the subscriber, and a communication is made to a member of the subscriber's contact list providing information relating to the subscriber and the situation.

20 Claims, 3 Drawing Sheets

METHOD AND SYSTEM FOR ALERTING A PERSON TO A SITUATION

CROSS-REFERENCE TO RELATED APPLICATIONS

This application is a continuation of U.S. patent application Ser. No. 11/180,424 filed Jul. 13, 2005 now U.S. Pat. No. 7,046,140, the contents of which are incorporated by reference herein in their entirety, which is a continuation of U.S. patent application Ser. No. 10/439,259 filed May 14, 2003 now U.S. Pat. No. 7,071,821, the contents of which are incorporated by reference herein in their entirety.

BACKGROUND OF THE INVENTION

The present disclosure relates generally to a method and system for alerting a person to a situation, and particularly to a method and system for alerting a member of a contact list to an emergency situation.

With the advent of cellular communications, individuals have turned to the cellular telephone system for assistance in the event of an emergency situation. A cellular subscriber can initiate an emergency call to a variety of emergency personnel or to any number of personally known emergency contacts. In making the emergency cellular call, the subscriber manually enters the appropriate telephone number into the cellular keypad, awaits a response, and then personally communicates the nature of the emergency to the answering party. If the target number is non-responsive, the subscriber must personally repeat the process by initiating another call. To place each call, the subscriber must know or have saved in the cellular device the number to be called, and must be careful under the stress of the emergency situation not to enter an incorrect number. With each call placed, valuable time may be lost. Upon reaching a call recipient, the subscriber is often asked what their location is, which may or may not be known to the caller, and if it is known, the call recipient may not be close enough to the caller to provide assistance. Accordingly, it would be beneficial to advance the art of alerting persons to an emergency situation.

SUMMARY OF THE INVENTION

In one embodiment, a method of alerting a person to a situation is disclosed. An alert signal is received from a mobile communication device in signal communication with a wireless communication system and an alert system. In response to the alert signal, a database of an alert service is accessed for information relating to the subscriber of the mobile communication device and for information relating to a contact list associated with the subscriber. Information is obtained from the wireless communication system relating to the location of the subscriber, and a communication is made to a member of the subscriber's contact list providing information relating to the subscriber and the situation.

In another embodiment, an application server for alerting a person to a situation is disclosed. The application server includes application software for: inputting information into a database of an alert service relating to a subscriber of a mobile communication device; receiving an alert signal from a mobile communication device in signal communication with a wireless communication system and an alert system; accessing the database for information relating to the subscriber of the mobile communication device and for information relating to a contact list associated with the subscriber; obtaining information from the wireless communication system relating to the location of the subscriber; and communicating to a member of the subscriber's contact list information relating to the subscriber and the situation.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention provides a method and system for alerting a person to an emergency situation.

Figure 1:
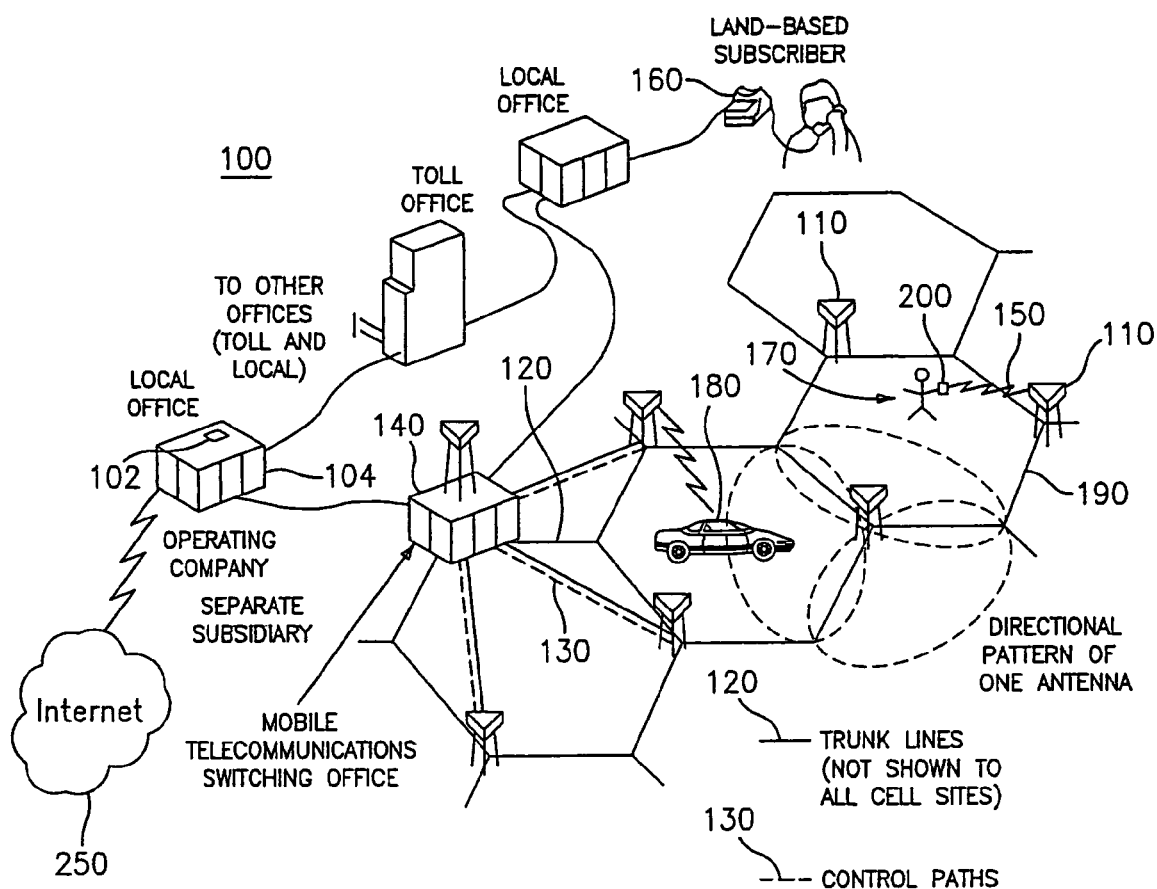
FIG. 1 illustrates an exemplary wireless communication system for employing an embodiment of the invention.

FIG. 1 is an exemplary embodiment of a Wireless Communication System (WCS) 100, such as a Wireless Telephone System (WTS) or a Cellular Telephone System (CTS), having a network of cell sites 110 in signal communication, via data and voice channels (trunk lines) 120 (not all channels shown) and control paths 130, with a Mobile Telecommunications Switching Office (MTSO) 140 (also referred to as a Mobile Switching Center, MSC). The cell sites 110 are in signal communication via RF (Radio Frequency) signal 150 with a mobile communication device (MCD) 200 held by a user (subscriber of the MCD) 170. MCD 200 may also be operable within an automobile 180, or any other vehicle. MCD 200 may be a hand-operated panic button device, a self-activating emergency signaling device, or an emergency button (or sequence of button strokes) on a cellphone, for example. In an embodiment where MCD 200 is a panic button device, the device may be operated from a keychain, a necklace, a wristband, or any other suitable utility. In an embodiment where MCD 200 is a self-activating emergency signaling device, the device may be integral with vehicle 180 and may be triggered upon the occurrence of an accident, a sudden impact, the deployment of an airbag, or any other emergency situation involving the vehicle, for example. In an embodiment where MCD 200 is a cellphone, a speed-dial number may be used to activate the alert signal, or alternatively, the placing of an emergency 911 call may activate the alert signal in addition to the placing of a call to 911 emergency personnel. Each cell site 110 contains a tower, an antenna, a radio transceiver and a base station controller (collectively 110) that manages, sends, and receives traffic to and from a MCD 200 in its geographical area defined by grid 190 from and to a cellular telephone switch (not shown) and distant MSC 140. MSC 140 may place calls from MCD 200 to land based telephones 160, may switch calls between cells as MCD 200 travels across cell boundaries 190, and may authenticate the Mobile Identification Number (MIN) of MCD 200. MSC 140 is in signal communication with a Local Office (LO) 104, which may be in signal communication with many MSCs 140 and many telephones 160, which may be land based or cellular. LO 104 includes a processing center 102 for processing incoming and outgoing calls and for communicating with an alert service 305 via the Internet 250, best seen by referring to FIG. 2.

Figure 2:
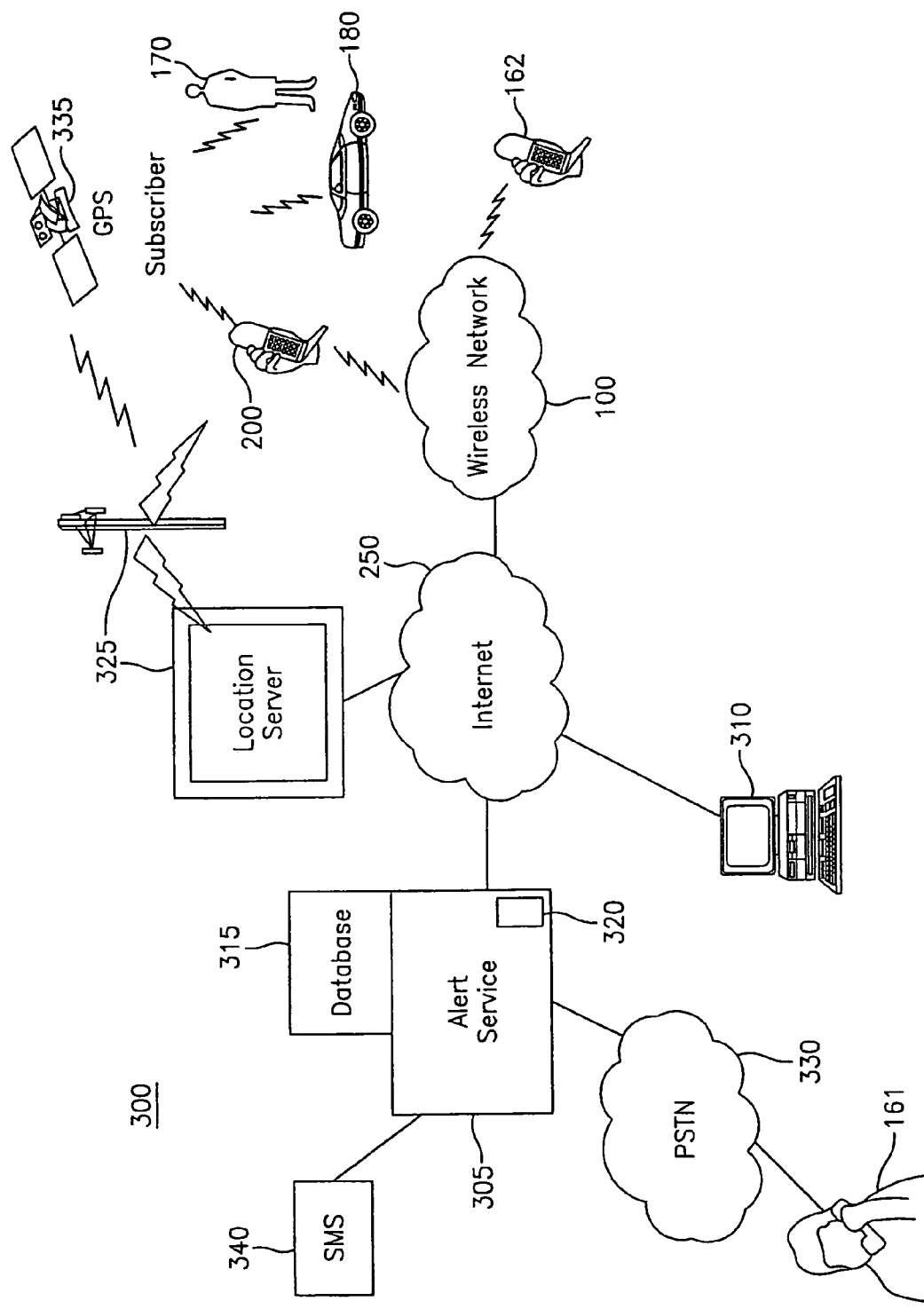
FIG. 2 illustrates an exemplary alert system in accordance with an embodiment of the invention.
Figure 3:
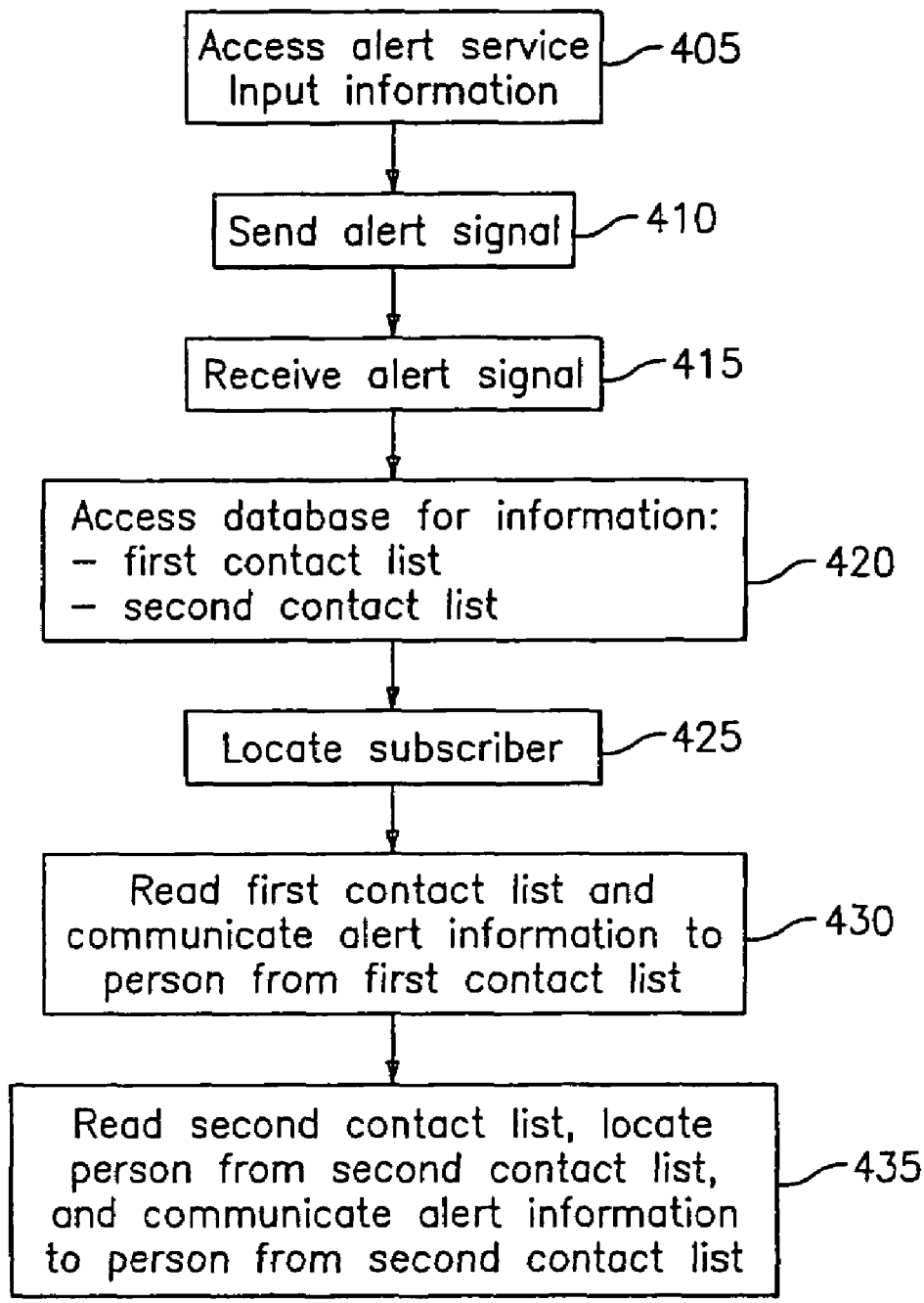
FIG. 3 depicts an exemplary method of implementing an embodiment of the invention.

Referring now to FIGS. 2 and 3, an alert system 300, and a method 400 for interfacing with alert system 300 and for alerting a person to an emergency situation is depicted. At the outset, subscriber 170 establishes a personal profile and emergency contact lists by accessing 405 alert service 305 via the Internet 250 and a web browser equipped computer 310 to input subscriber information into a database 315. The subscriber information (personal profile) may include, for example, the subscriber's name, home telephone number, work telephone number, cellphone number, home address, and information relating to two lists of contacts. In an embodiment, the first contact list includes those individuals who should be contacted in an emergency situation when an alert signal is received from subscriber 170, and the second contact list includes those individuals who should be contacted in an emergency situation if they are also in the vicinity of subscriber 170 when the alert signal is received at alert service 305. Members of the first contact list are referred to as emergency contacts and are depicted, for example, as 161 in FIG. 2, and members of the second contact list are referred to as friends and family contacts and are depicted, for example, as 162 in FIG. 2. Information input into database 315 relating to the two lists of contacts includes, for example, the contact's name, home telephone number, work telephone number, cellphone number, pager number/address, and email address. Once a personal profile has been input into database 315, subscriber 170 may at a later date access alert system 300 via the Internet 250 to update the contents of the stored personal profile. By establishing a personal profile, including contact lists, alert system 300 can automatically, upon activation, send an emergency message to a member of the contact lists without further involvement by subscriber 170, as will be discussed in more detail below.

Activation of alert service 305 occurs in response to subscriber 170 sending 410 an alert signal via MCD 200 to CTS 100. As discussed above, subscriber 170 may send the emergency alert signal via a panic button, a self-activated signaling device (air bag activation sensor in a vehicle for example), a cellphone, or any other suitable means for initiating the emergency signal. In an embodiment, the alert signal travels through CTS 100 via RF signal 150, cell site 110, trunk lines 120, MTSO 140, and LO 104 to Internet 250, where it is received 415 at alert service 305 via an application server 320. Once the emergency alert signal is sent and received at application server 320, alert system 300 becomes fully automated to deliver an appropriate emergency message to a member of the contact lists.

In response to application server 320 receiving 415 the alert signal, application server 320 accesses 420 database 315 for information relating to subscriber 170 and for information relating to the first and second contact lists, discussed above, and polls 425 CTS 100 for information relating to the location of subscriber 170, which, as discussed below, is information passed on to a member of the contact lists. In an embodiment, MCD 200 may be equipped with Global Positioning System (GPS) technology, in which case MCD 200 may, in combination with GPS 335, provide the subscriber location information to application server 320. In another embodiment, a location server 325 may be equipped with server-aided GPS technology, in which case application server 320 may poll location server 325 for the subscriber location information. In a further embodiment, CTS 100 may be equipped with signal strength or signal triangulation analysis technology, in which case CTS 100 may provide the subscriber location information to application server 320. In yet another embodiment, a third party position locating service utilizing other locating technology may be polled by location server 320 for the subscriber location information.

Upon receipt of information relating to the location of subscriber 170, which in an embodiment includes the address of subscriber 170 at the time the alert signal was sent, application server 320 commences an automated process 430 that includes: reading the emergency contact list at database 315; contacting an individual 161 on the emergency contact list; and, communicating to the contact person 161 information relating to the subscriber and the situation. In an embodiment, this information may include the identity of the subscriber, a notice of the emergency situation, the location of subscriber 170, and a text message, which may all be included in a single message from a Short Message Service (SMS) 340. The SMS message may be limited to a maximum number of characters, such as 256 characters for example, and may be created by SMS 340 depending on the nature of the alert signal received at alert service 305. For example: if the alert signal was received from a panic button 200, the SMS message may include information that an emergency panic button signal has been received; if the alert signal was received from a cellphone 200, the SMS message may include information that a emergency cellphone signal has been received; if the alert signal was received from a self-activating device responding to an vehicle impact condition, the SMS message may include information that a emergency vehicle impact signal has been received; or, if the alert signal was received from a self-activating device responding to a vehicle airbag deployment, the SMS message may include information that an emergency airbag deployment signal has been received. Other SMS messages may be communicated as appropriate under the circumstances. If a member 161 of the emergency contact list is unavailable, application server 320 automatically proceeds through the list until at least one member 161 is contacted or the list is exhausted. Emergency contacts 161 may be accessed through a Public Switching Telephone Network (PSTN) 330, CTS 100, or Internet 250 via email, for example.

In addition to communicating with emergency contacts 161, application server 320 commences an automated process 435 that includes: reading the friends and family contact list at database 315 for a mobile phone (cellphone for example) number of a friends and family individual 162; locating the position of individual 162 by polling alert system 300, by, for example, polling a location server 325, polling a locating service having access to location server 325, polling a GPS 335, or polling locating technology embedded within CTS 100; determining whether the individual 162 is in the vicinity of subscriber 170, by, for example, determining whether the individual 162 is within a predefined geographic radius to subscriber 170; contacting the individual 162 if they are in the vicinity of subscriber 170; and, communicating to the contact person 162 information relating to the subscriber and the situation. As discussed above, this information may include the identity of the subscriber, a notice of the emergency situation, the location of subscriber 170, and a text message, which may all be embedded in an SMS message. If a member 162 of the friends and family contact list is unavailable or not in the vicinity of subscriber 170, application server 320 automatically proceeds through the list until at least one member 162 is contacted or the list is exhausted. In an alternative embodiment, application server 320 polls the friends and family contact list more than once, broadening on each pass the geographical area for determining whether an individual 162 is in the vicinity of subscriber 170 or not, until at least one member 162 is contacted or the list is repeatedly exhausted a predefined number of times.

In accordance with an embodiment of the invention, alert system 300 provides an automated way for subscriber 170 to alert an emergency contact person, and a friends and family member who is in the vicinity of the subscriber, that the subscriber is in an emergency situation. Once the emergency signal is received at alert system 300, alert system 300, via alert service 305 and application server 320, automatically manages the process of detecting the emergency signal, locating the subscriber, querying the database for contact information, locating a friends and family member in the vicinity of the subscriber, generating a SMS message, and delivering the SMS message to the appropriate persons, thereby providing subscriber 170 with rapid emergency response. In an alternative embodiment, application server 320 may place a recorded message to a land-based phone 160, or may send the SMS message to an email address.

Some embodiments of the invention have some of the following advantages: timely response to an emergency call; automated calling to multiple emergency contacts; automated locating and calling of a contact in the vicinity of the caller; no need for subscriber to remember emergency contact numbers; alert signaling devices available in various forms; ability to access and update contact list via the Internet; communication of an informational text message depending on the signaling device employed; self-activated triggering in the event of a vehicle accident; and, subscriber location automatically communicated to the call recipient at the time of alert signaling.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for alerting a third party to an emergency event involving a mobile subscriber comprising:
   inputting information into a database of an alerting service relating to a subscriber of a mobile communication device;
   receiving an alert signal from the mobile communication device in signal communication with a wireless communication system and an alert system; and
   accessing the database for information relating to the subscriber of the mobile communication device and for information relating to a contact list associated with the subscriber, in response to the alert signal, the contact list including a list of contacts who are to be contacted upon the occurrence of the alert signal;
   wherein the contact list includes a first contact list and a second contact list, the first contact list including first individuals to be contacted in response to the alert signal, the second contact list including second individuals to be contacted in response to the alert signal, wherein only second contacts in the vicinity of the subscriber will be alerted.

2. The method of claim 1, further comprising:
   obtaining information at least partially from the wireless communication system relating to a location of the subscriber; and
   communicating to a member of the subscriber's contact list information relating to the subscriber and a situation.

3. The method of claim 1 wherein:
   the mobile communication device includes a panic button, the alert signal being generated in response to activation of the panic button.

4. The method of claim 1 wherein:
   the mobile communication device self-activates the alert signal in response to a situation.

5. The method of claim 4 wherein:
   the situation includes at least one occurrence of an accident, a sudden impact, deployment of an airbag, or an emergency situation.

6. The method of claim 4 wherein:
   the mobile communication device is integrated in a vehicle.

7. The method of claim 1 wherein:
   the contact list associated with the subscriber is provisioned by the subscriber accessing an alert service through a web browser.

8. The method of claim 1 wherein:
   the list of contacts includes multiple contact methods for at least one contact.

9. The method of claim 8 wherein:
   the multiple contact methods include at least two of a home phone number, mobile phone number, pager number and email address.

10. The method of claim 1 wherein:
    communicating to a member of the subscriber's contact list information relating to the subscriber and the situation includes communications with multiple contacts contemporaneously.

11. A computer program product for alerting a person to a situation, the computer program product comprising:
    a storage medium readable by a processing circuit and storing instructions for execution by the processing circuit for facilitating a method comprising:
    inputting information into a database of an alerting service relating to a subscriber of a mobile communication device;
    receiving an alert signal from the mobile communication device in signal communication with a wireless communication system and an alert system; and
    accessing the database for information relating to the subscriber of the mobile communication device and for information relating to a contact list associated with the subscriber, in response to the alert signal, the contact list including a list of contacts who are to be contacted upon the occurrence of the alert signal;
    wherein the contact list includes a first contact list and a second contact list, the first contact list including first individuals to be contacted in response to the alert signal, the second contact list including second individuals to be contacted in response to the alert signal, wherein only second contacts in the vicinity of the subscriber will be alerted.

12. The computer program product of claim 11, further comprising:

obtaining information at least partially from the wireless communication system relating to a location of the subscriber; and communicating to a member of the subscriber's contact list information relating to the subscriber and a situation.

13. The computer program product of claim 11 wherein:
the mobile communication device includes a panic button, the alert signal being generated in response to activation of the panic button.

14. The computer program product of claim 11 wherein:
the mobile communication device self-activates the alert signal in response to a situation.

15. The computer program product of claim 14 wherein:
the situation includes at least one occurrence of an accident, a sudden impact, deployment of an airbag, or an emergency situation.

16. The computer program product of claim 11 wherein:
the mobile communication device is integrated in a vehicle.

17. The computer program product of claim 11 wherein:
the contact list associated with the subscriber is provisioned by the subscriber accessing an alert service through a web browser.

18. The computer program product of claim 11 wherein:
the list of contacts includes multiple contact methods for at least one contact.

19. The computer program product of claim 18 wherein:
the multiple contact methods include at least two of a home phone number, mobile phone number, pager number and email address.

20. The computer program product of claim 11 wherein:
communicating to a member of the subscriber's contact list information relating to the subscriber and the situation includes communications with multiple contacts contemporaneously.

* * * * *